United States Patent [19]

Gerrit

[11] Patent Number: 5,505,122
[45] Date of Patent: Apr. 9, 1996

[54] APPARATUS FOR TRANSPORT OF WARM FOODSTUFFS

[76] Inventor: Smit Gerrit, Gildenburg 458, NL-7423 ZK Colmschate, Netherlands

[21] Appl. No.: 119,045

[22] PCT Filed: Mar. 11, 1992

[86] PCT No.: PCT/NL92/00048

§ 371 Date: Dec. 3, 1993

§ 102(e) Date: Dec. 3, 1993

[87] PCT Pub. No.: WO92/16137

PCT Pub. Date: Oct. 1, 1990

[30] Foreign Application Priority Data

Mar. 12, 1991 [NL] Netherlands ............ 91.00436

[51] Int. Cl.⁶ .................... A23L 3/00; F24B 5/00; F24B 7/04
[52] U.S. Cl. .................... 99/476; 99/340; 99/483; 126/19.5; 126/21 A; 126/268; 219/386; 219/399; 219/400
[58] Field of Search ............... 99/475, 476, 483, 99/340, 357; 126/21 A, 19.5, 268; 219/400, 386, 395, 399

[56] References Cited

U.S. PATENT DOCUMENTS

| | | |
|---|---|---|
| 1,412,761 | 4/1922 | Tingstrom . |
| 3,013,548 | 12/1961 | Thomas ............ 126/19.5 |
| 3,288,129 | 11/1966 | Fox ............ 126/19.5 |
| 3,521,030 | 7/1970 | Maahs ............ 219/386 |
| 3,590,802 | 7/1971 | Fried ............ 126/19.5 |
| 3,614,923 | 10/1971 | Thompson ............ 99/234 |
| 3,658,047 | 4/1972 | Happel ............ 126/21 A |
| 3,874,361 | 4/1975 | Parrinello ............ 126/19.5 |
| 4,109,636 | 8/1978 | Burge ............ 126/21 A |
| 4,244,979 | 1/1981 | Roderick ............ 126/21 A |
| 4,924,763 | 5/1990 | Bingham ............ 126/21 A |

FOREIGN PATENT DOCUMENTS

| | | | |
|---|---|---|---|
| 0387212 | 9/1990 | European Pat. Off. ......... | A47J 39/00 |
| 2810685 | 9/1979 | Germany ............ | A47J 39/02 |
| 8526356 | 1/1986 | Germany ............ | A47B 31/02 |
| 9014240 | 2/1991 | Germany ............ | A47J 39/02 |
| 1448668 | 9/1976 | United Kingdom ............ | F24C 1/00 |

Primary Examiner—David Scherbel
Assistant Examiner—Randall E. Chin
Attorney, Agent, or Firm—Webb Ziesenheim Bruening Logsdon Orkin & Hanson

[57] ABSTRACT

Container for transporting warm foodstuffs with a first closable space (1) for the foodstuffs for transporting, a second closable space (2) in thermal contact with a heat source (5), and means (3) for transporting air from said second space to said first space. Container wherein the first space and the second space are mutually adjacent and are mutually separated by an air-permeable partition (4), and the means for transporting air can comprise a fan (3). The heat source comprises for instance a heat exchanger (5) provided with a supply conduit (6) and a discharge conduit (7) for a heat transporting medium, in particular a radiator (5) accommodated in the second space and/or an electrical heating element or a combustion heater (10), in particular a combustion heater operating on motor fuel.

14 Claims, 2 Drawing Sheets

APPARATUS FOR TRANSPORT OF WARM FOODSTUFFS

The invention relates to an apparatus for transporting warm foodstuffs which comprises a container.

Such an apparatus is known. Known containers consist for instance of heat insulating material and are frequently used for transporting foodstuffs prepared in a restaurant to homes of customers. In this application the container is placed in or on a vehicle (car or motorbike).

The drawback associated with the known containers is that they retain the moisture rising from the steaming hot food, causing it to precipitate again onto the food with the result that the quality of these dishes greatly diminishes.

Crispy foodstuffs or parts thereof such as the crust of a pizza are in danger of rapidly becoming mushy when transported in a known container. Arranging openings in the known container in order to drain off moisture results in rapid cooling of the transported foodstuffs.

In U.S. Pat. No. 3,614,923 an apparatus for transport of warm foodstuffs has been described in which part of the above drawbacks have been overcome. In U.S. Pat. No. 3,614,923 a food warmer including an upright cabinet having a warming and storage compartment, and a closed forced air heating system for providing moisture regulated heated air to the warming and storage compartment whereby food is kept warm under a controlled atmosphere has been disclosed. The forced air heating means includes a jet type gas burner suitably connected with a source of gas. An application in which this known container is placed in a motor vehicle is not known from the cited publication.

The German Gebrauchsmuster DE-U-90 14 240 relates to an apparatus for keeping warm and transporting foodstuffs, especially pizza's in a heat-isolating container comprising a heater, characterized in that the container comprises a lower part and a releasable upper part. The lower part comprises a blower unit and a heater unit with an air conduit and a moisture extracting arrangement with a blower unit and a moisture extracting conduit, both said conduits debouching in the upper part.

In GB-A-1 448 668 an oven is described, provided with a heating apparatus and an impeller for producing oscillations of the air within the oven-chamber.

In DE-A-28 10 685 a refrigerator has been disclosed, comprising an induction heating unit, controlled by a timer. Food that is stored in the refrigerator can be warmed up by means of the said induction heater.

The German Gebrauchsmuster DE-U-85 26 356 relates to a container provided with wheels, for serving meals. The container comprises a warm and a cold compartment, both being climatized by the same cooling aggregate.

EP-A-0 387 212 relates to an apparatus for re-heating food stuffs, stored in a container. The re-heating takes place by enforced circulation of heated air over the stored food in the container.

It is an object of the invention to provide a container which is suited for use in a motor vehicle, with which container the drawbacks of known containers are not associated.

This object is achieved in accordance with the invention with an apparatus for transporting warm foodstuffs, comprising a container having a first closable space for the foodstuffs for transporting and a second closable space in thermal contact with a heat source, said heat source comprising a combustion heater, provided with a supply conduit and a discharge conduit for a heat transporting medium, said conduits being connected to the second space, characterized in that the combustion heater operates on petrol or diesel.

In a container according to the invention, air is conditioned in the second space, in this case heated, for example by a combustion heater operating on diesel, and the conditioned air is then carried to the first space in which the foodstuffs for transporting can be placed.

In one embodiment the first space and the second space are mutually adjacent and are separated by an air-permeable wall. This wall can consist of perforated material or of closed material in which air holes are arranged, or can be air-permeable in other manner.

The apparatus in which the first and the second spaces are mutually adjacent is particularly compact. Because the partition wall between the first and the second space is air-permeable, such an apparatus easily provides that the air circulation in the first space is continuous.

In certain embodiments, the means for transporting air comprises a fan. It has been found that in such an apparatus with an air circulation forced by a fan, foodstuffs not only remain warm during transport but also crispy fresh.

In a further embodiment, the heat source is a heat exchanger provided with a supply and discharge conduit for a heat transporting medium.

The heat exchanger according to the latter embodiment is preferably a radiator which is accommodated in the second space and the supply and discharge conduits of which are provided with a quick action couplings. Such an apparatus can be used in simple manner in various places or in various transporting means, wherein the radiator can for example be connected to an already present hot water supply.

In yet another embodiment, the heat source is a combustion heater, in particular a combustion heater operating on motor fuel.

Such an apparatus is particularly suited for use in a delivery van, especially when the apparatus includes a radiator. The container is then placed on the loading floor of the vehicle and the supply and discharge conduits from the radiator are connected to a hot water circuit of the relevant vehicle. When the vehicle motor is in operation, the apparatus obtains the required heat from the vehicle motor and when the latter is switched off, the combustion heater of the container, for example a combustion heater operating on petrol or diesel, takes over the function of the radiator.

The application of an apparatus according to the invention is in no way limited to transport means for road transport. Such an apparatus can also be placed in ships, trains and aircraft. In an embodiment eminently suited for electric rail transport, the heat source is an electric heating element.

It has been found that a particularly good circulation of conditioned air is obtained when the second space is provided with a sloping bottom rising in the direction of the air transport.

In an embodiment which is especially suitable for transporting foodstuffs with a relatively high moisture content, the container comprises means for discharging condensed moisture.

For applications in which relatively high demands are made with respect to air humidity, the invention provides means for forced condensation of moisture from the transported air. These means may be present either in the first or the second space or outside these.

The usefulness and convenience of use of the apparatus are increased still further when the container is provided on the underside with support elements, for example feet or castor wheels.

In a preferred embodiment of an apparatus according to the invention, the first space is substantially block-shaped and is at least partially enclosed on two opposite sides and on the bottom surface by the second space, wherein said enclosed opposite sides are air-permeable and the bottom surface is closed.

In such an embodiment, it is possible to achieve an optimal air circulation by placing for example a radiator and a fan under the closed bottom of the first space and to admit the conditioned, in this case heated, air via one air-permeable side into the first space filled with foodstuffs and to discharge this air via the opposite air-permeable side.

An apparatus provided with a combustion heater is advantageously characterized by a thermostat regulator for controlling this combustion heater.

The advantages of a combustion heater with a thermostat regulator are optimally utilized for instance in an apparatus which also comprises a radiator which is connected to the hot water circuit of a vehicle. In an apparatus where the necessary heat is primarily supplied by the radiator, the combustion heater provides the required heat when the vehicle motor is switched off causing the hot water in the radiator to cool.

A thermostat regulator is preferably timer controlled.

A timer controlled thermostat regulator can be employed for instance in a transporting device placed in a vehicle in order to effect pre-heating of the container using the combustion heater from a predetermined time prior to loading of the container and the departure of the vehicle. Using the timer controlled thermostat regulator the installation can also of course be switched off at a predetermined time.

According to the invention, the apparatus can be provided with a third closable space for cooled transport of foodstuffs.

A container which is provided with such a third space and a per se known cooling device is eminently suitable for transporting and delivering complete meals at serving temperature.

The invention further relates to boxes provided with one or more air-permeable surfaces evidently intended for a transporting device according to the invention.

It has been found that the advantageous properties of the apparatus can be utilized optimally when the foodstuffs are placed in boxes according to the invention, in particular when these boxes are placed in the container such that at least one air-permeable surface is placed substantially perpendicular to the feed direction of the warm air for transporting.

The invention finally relates to a transport means that is characterized by an apparatus according to the invention described herein.

The invention will now be further elucidated in the light of several embodiments with reference to the drawing.

Figure 1:
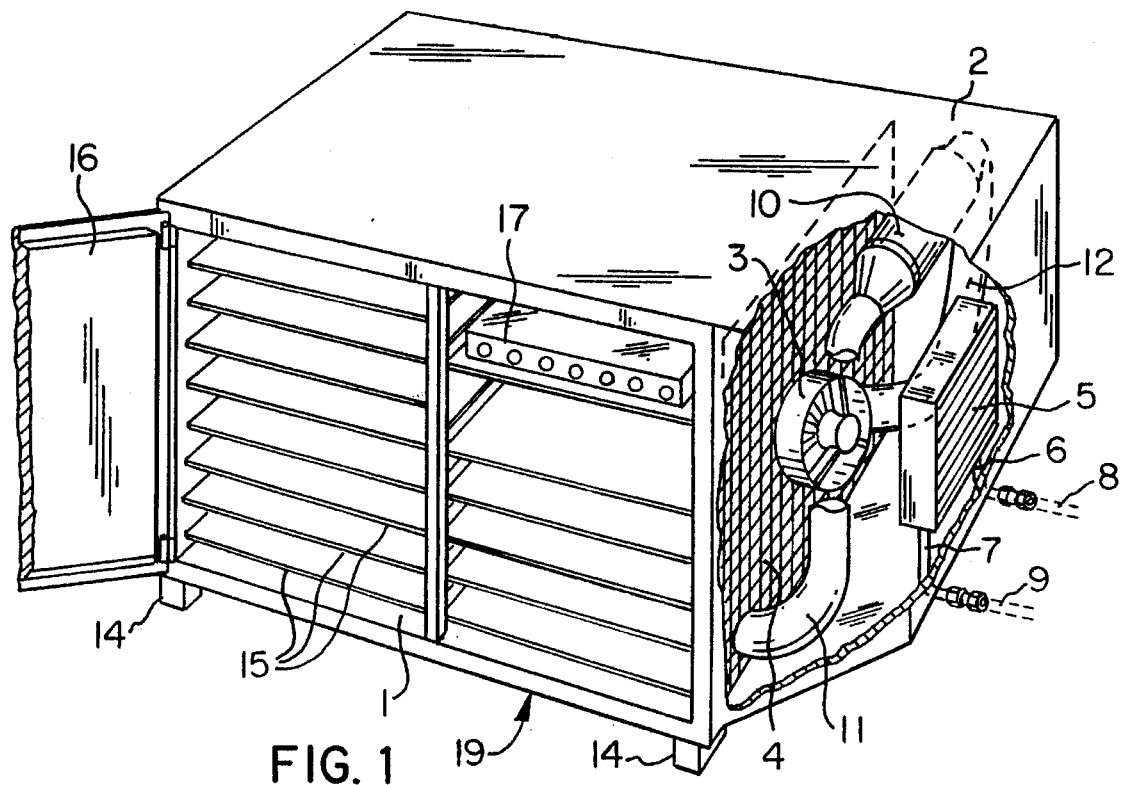
FIG. 1 shows a container in perspective view.

FIG. 1 shows a container 19 with first space 1, second space 2, a fan 3, an air-permeable wall 4, a radiator 5 with supply conduit 6 and discharge conduit 7 which are coupled with lines 8 and 9, respectively, to the hot water circuit of an existing installation (for instance of an automobile), heating device 10 with conduits for warm air 11 and air to be heated 12, upward sloping bottom part 13, support elements 14 on the underside of the container, sliding trays 15 (for example of stainless steel or plastic material) for the foodstuffs for transporting (preferably in boxes 17 with at least one air-permeable surface, which boxes 17 are placed with the air-permeable surface perpendicular to the feed direction of the heated air), and finally a door 16 with which the first space can be closed off.

Figure 2:
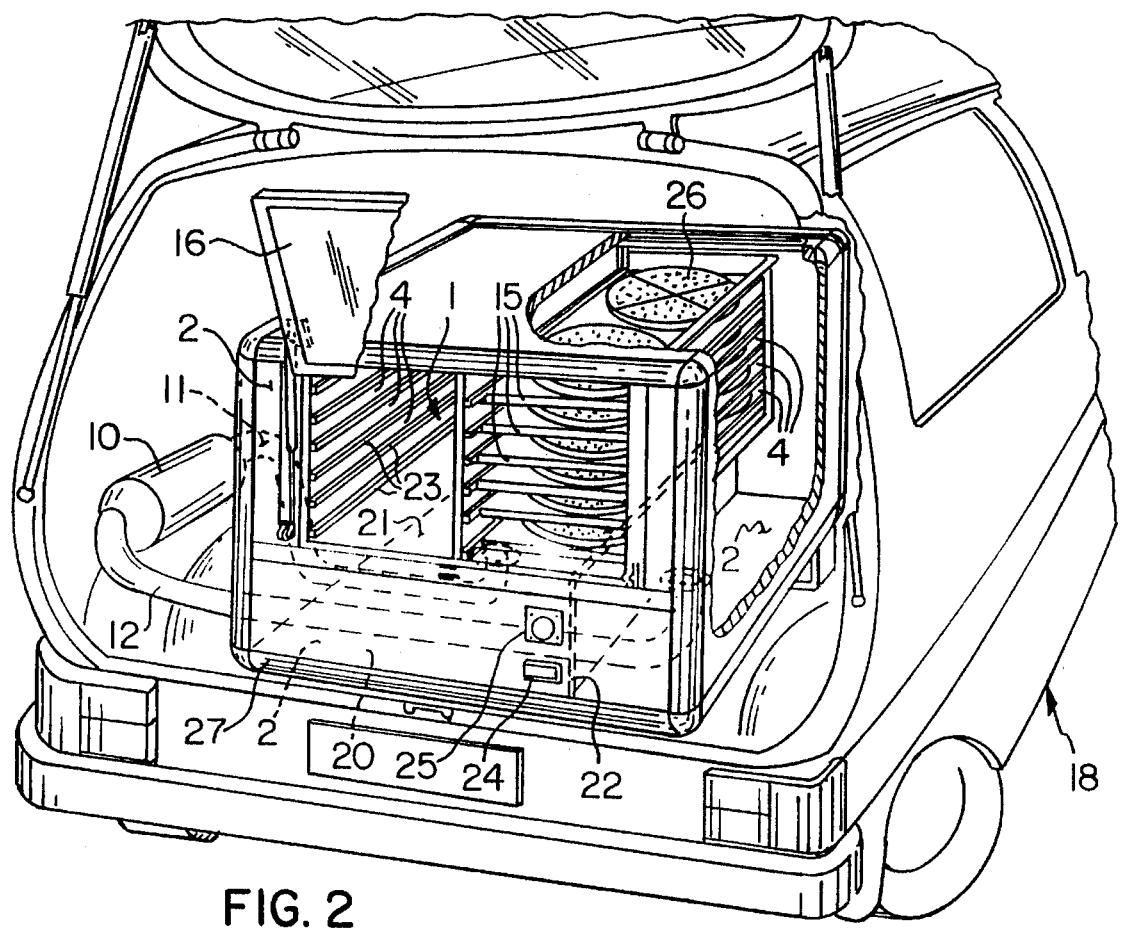
FIG. 2 shows a perspective view of a container disposed in a vehicle according to another embodiment according to the invention.

FIG. 2 shows a container 27 placed in a delivery van 18 and again having a space 1 for the foodstuffs for transporting and a space 2 which in this embodiment extends beneath and to either side adjacently of the first space. The vertical partition walls 4 between the first and the second space are completely open; they are only interrupted by the tray guides 23 for the trays 15 on which the foodstuffs 26 lie. The foodstuffs 26 are kept warm using a combustion heater 10 from which warm air is admitted into the second space via a supply conduit 11 running through the bottom 20 of the container 27, under the closed bottom 21 of the first space 1. The warm air spreads via the bottom 21 to the part of the second space 2 extending along the left-hand air permeable side wall 4 of the first space 1. The warm air is carried via the left-hand air-permeable side wall 4 along the trays 15 with foodstuffs 26 and is carried away via the right-hand air-permeable wall to the air discharge conduit 12 which protrudes through the right side of the container bottom 20 and which leads back to the combustion heater 10. An upstanding partition 22 between the bottom 20 of the container 27 and the bottom 21 of the first space 1 effects a homogenous distribution and a correct flow direction of the conditioned air coming out of the supply conduit 11. The temperature of the air is controlled using a thermostat 24 which can be bridged when necessary by a time switch 25.

Figure 3:
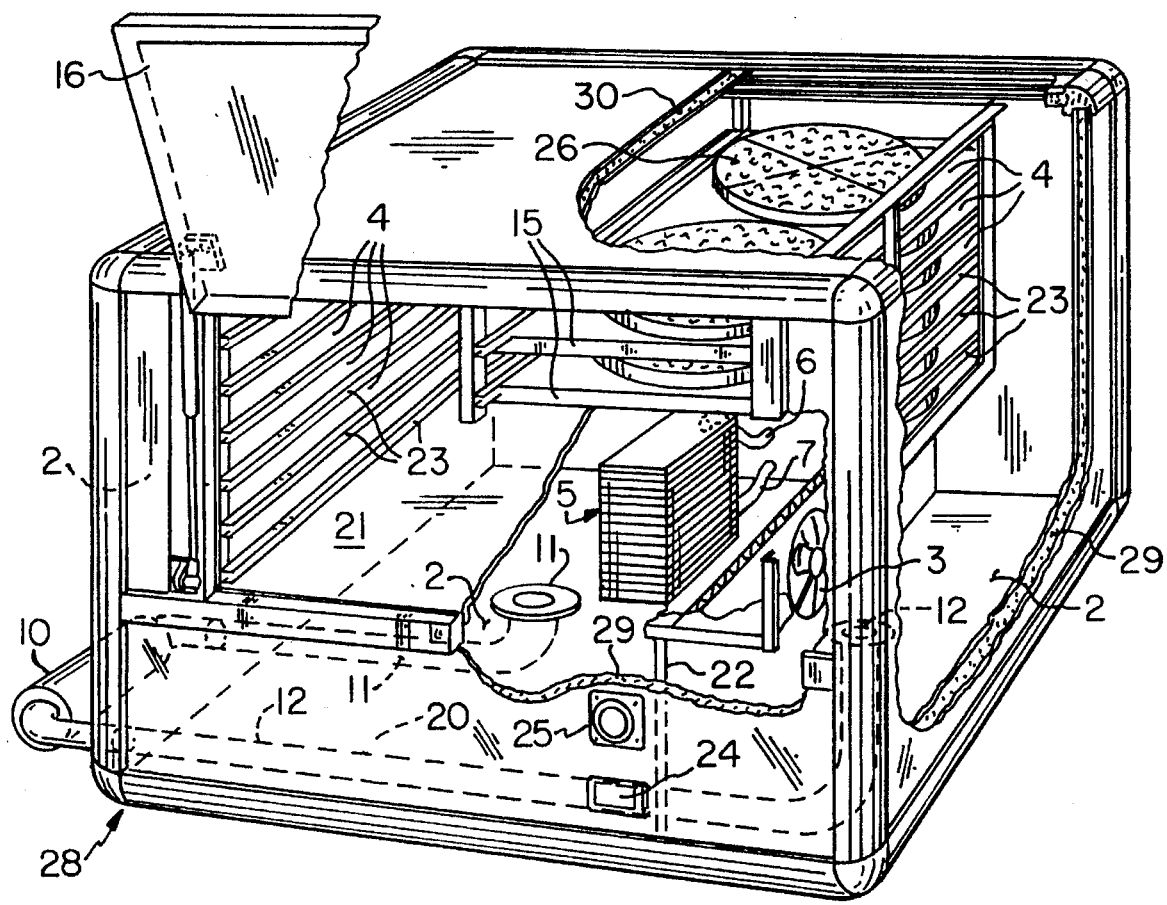
FIG. 3 shows a cut away perspective view of a third embodiment of a container.

FIG. 3 shows a container 28 which is a slightly adapted version of the container 27 of FIG. 2. The container 28 provided with walls 29, a top panel 30 and bottom 20 of thermally insulating material comprises in the second space 2 under the bottom 21 of the first space 1 a radiator 5 provided with a supply conduit 6 and a discharge conduit 7 and a fan 3 received in the standing partition 22. The conduits 6 and 7 can be connected with quick action couplings (not shown) to corresponding conduits in for example an automobile. The air in the container 28 is then conditioned by the combined action of the combustion heater 10 (not shown) and the radiator 5. The operation of a container 28 placed in a delivery van and the conduits 6, 7, 11, 12 of which are respectively connected to a hot water circuit and the combustion heater (not shown) of the vehicle is as follows. At a chosen time prior to loading of the container, the combustion heater 10 is started using the time switch 25, as a result of which the container is pre-heated until the desired temperature set with the thermostat 24 is reached.

The temperature is kept to the correct level using thermostat regulator 24 and combustion heater 10 until after the departure of the vehicle the hot water circuit of the vehicle has reached a sufficiently high temperature, at which point the radiator 5 in combination with fan 3 takes over the heating and circulating of the air, either completely or partially, from the combustion heater 10. Because heat from the engine block is supplied to the radiator 5 through supply conduit 6 via heated cooling water, use of this radiator signifies a considerable energy saving. When an engine is running, the heat from the engine block is in any case always available.

I claim:

1. An apparatus for transporting warm foodstuffs in a vehicle having a hot water circuit, said apparatus comprising:

a first space configured to store foodstuffs which are being transported;

a second space adjacent said first space and in thermal communication with said first space;

a heat source selected from the group consisting of a combustion heater and an electric heating element, said heat source having a supply conduit and a discharge conduit for a heat transporting medium, wherein said supply conduit and said discharge conduit are connected to said second space, wherein said second space is in thermal contact with said heat source; and a radiator located in said second space, wherein said radiator is connected to said hot water circuit of the vehicle, wherein said first space further includes two opposite side walls and a bottom wall, said first space is substantially block shaped, said second space at least partially encloses said first space on said two opposite side walls and said bottom wall of said first space, said opposite side walls of said first space are air-permeable, and said bottom wall of said first space is air-impermeable.

2. The apparatus as claimed in claim 1, further including a partition in said second space, said partition extending substantially downward from said bottom wall of said first space, wherein said supply conduit and said discharge conduit of said heat source have openings on opposite sides of said partition.

3. The apparatus as claimed in claim 2, further including a fan positioned within said partition.

4. The apparatus as claimed in claim 1, wherein said second space includes a sloping bottom which rises in the direction of movement of said heat transporting medium.

5. The apparatus as claimed in claim 1, wherein said radiator is connected to said hot water circuit by at least one quick action coupling.

6. An apparatus for transporting warm foodstuffs in a vehicle having a hot water circuit, said apparatus comprising:

a first space configured to store foodstuffs which are being transported;

a second space adjacent said first space and in thermal communication with said first space;

a heat source including a combustion heater, said heat source having a supply conduit and a discharge conduit for a heat transporting medium, wherein said supply conduit and said discharge conduit are connected to said second space, wherein said second space is in thermal contact with said heat source; and a radiator located in said second space, wherein said radiator is connected to said hot water circuit of the vehicle, and said combustion heater operates on petrol.

7. The apparatus as claimed in claim 6, wherein said radiator is connected to said hot water circuit by at least one quick action coupling.

8. The apparatus as claimed in claim 6, wherein said second space includes a sloping bottom which rises in the direction of movement of said heat transporting medium.

9. An apparatus for transporting warm foodstuffs in a vehicle having a hot water circuit, said apparatus comprising:

a first space configured to store foodstuffs which are being transported;

a second space adjacent said first space and in thermal communication with said first space;

a heat source including a combustion heater, said heat source having a supply conduit and a discharge conduit for a heat transporting medium, wherein said supply conduit and said discharge conduit are connected to said second space, wherein said second space is in thermal contact with said heat source; and a radiator located in said second space, wherein said radiator is connected to said hot water circuit of the vehicle, and said combustion heater operates on diesel.

10. The apparatus as claimed in claim 9, wherein said radiator is connected to said hot water circuit by at least one quick action coupling.

11. The apparatus as claimed in claim 9, wherein said second space includes a sloping bottom which rises in the direction of movement of said heat transporting medium.

12. An apparatus for transporting warm foodstuffs in a vehicle having a hot water circuit, said apparatus comprising:

a first space configured to store foodstuffs which are being transported;

a second space adjacent said first space and in thermal communication with said first space;

a heat source selected from the group consisting of a combustion heater and an electric heating element, said heat source having a supply conduit and a discharge conduit for a heat transporting medium, wherein said supply conduit and said discharge conduit are connected to said second space, wherein said second space is in thermal contact with said heat source; and a radiator located in said second space, wherein said radiator is connected to said hot water circuit of the vehicle, wherein said first space further includes a bottom wall below said first space, wherein at least one side wall is positioned between said first space and said second space, and wherein said at least one side wall is permeable to said heat transporting medium.

13. The apparatus as claimed in claim 12, wherein said radiator is connected to said hot water circuit by at least one quick action coupling.

14. The apparatus as claimed in claim 12, wherein said second space includes a sloping bottom which rises in the direction of movement of said heat transporting medium.

* * * * *

UNITED STATES PATENT AND TRADEMARK OFFICE
CERTIFICATE OF CORRECTION

PATENT NO. : 5,505,122
DATED : April 9, 1996
INVENTOR(S) : Gerrit Smit

It is certified that error appears in the above-indentified patent and that said Letters Patent is hereby corrected as shown below:

On the title page, item's [19] & [76] Inventor: "Smit Gerrit" should
 --Gerrit Smit --.
On the title page, item [87] PCT Pub. Date: "Oct. 1, 1990"
 should read --OCt. 1, 1992--.

Column 2, line 28, "with a quick" should read --with quick --.

Signed and Sealed this

Sixth Day of August, 1996

Attest:

BRUCE LEHMAN

*Attesting Officer*   *Commissioner of Patents and Trademarks*